June 20, 1944.                    A. G. MIREL                    2,351,776
                           DUPLICATE CUTTING MACHINE
                           Filed Sept. 27, 1941            2 Sheets—Sheet 2
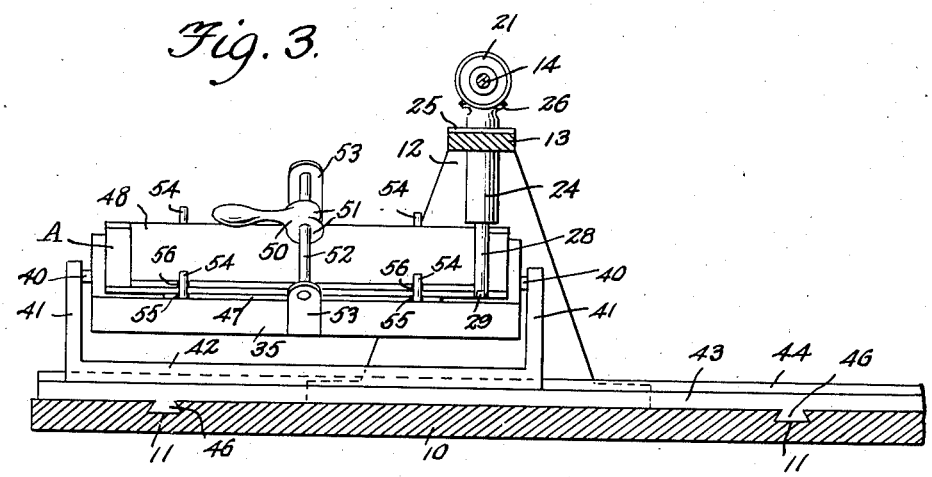
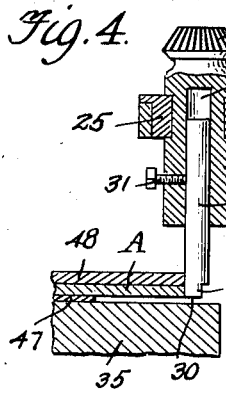
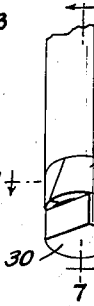
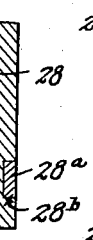
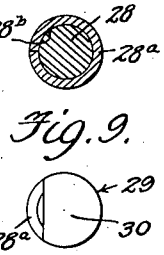
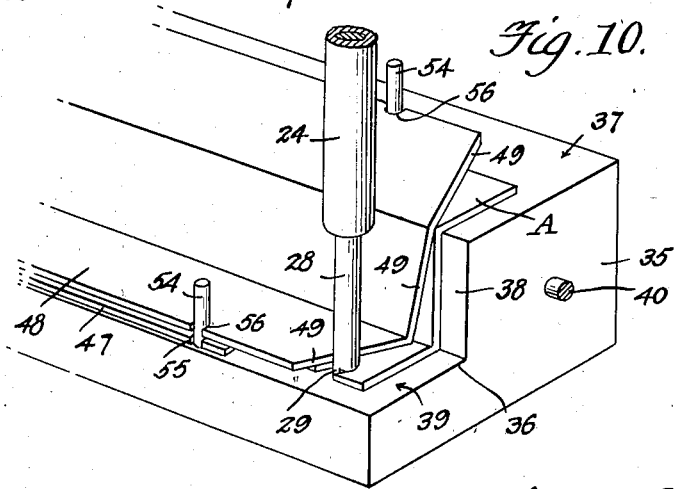
INVENTOR.
ARTHUR G. MIREL
BY
Clark & Ott
ATTORNEYS Patented June 20, 1944

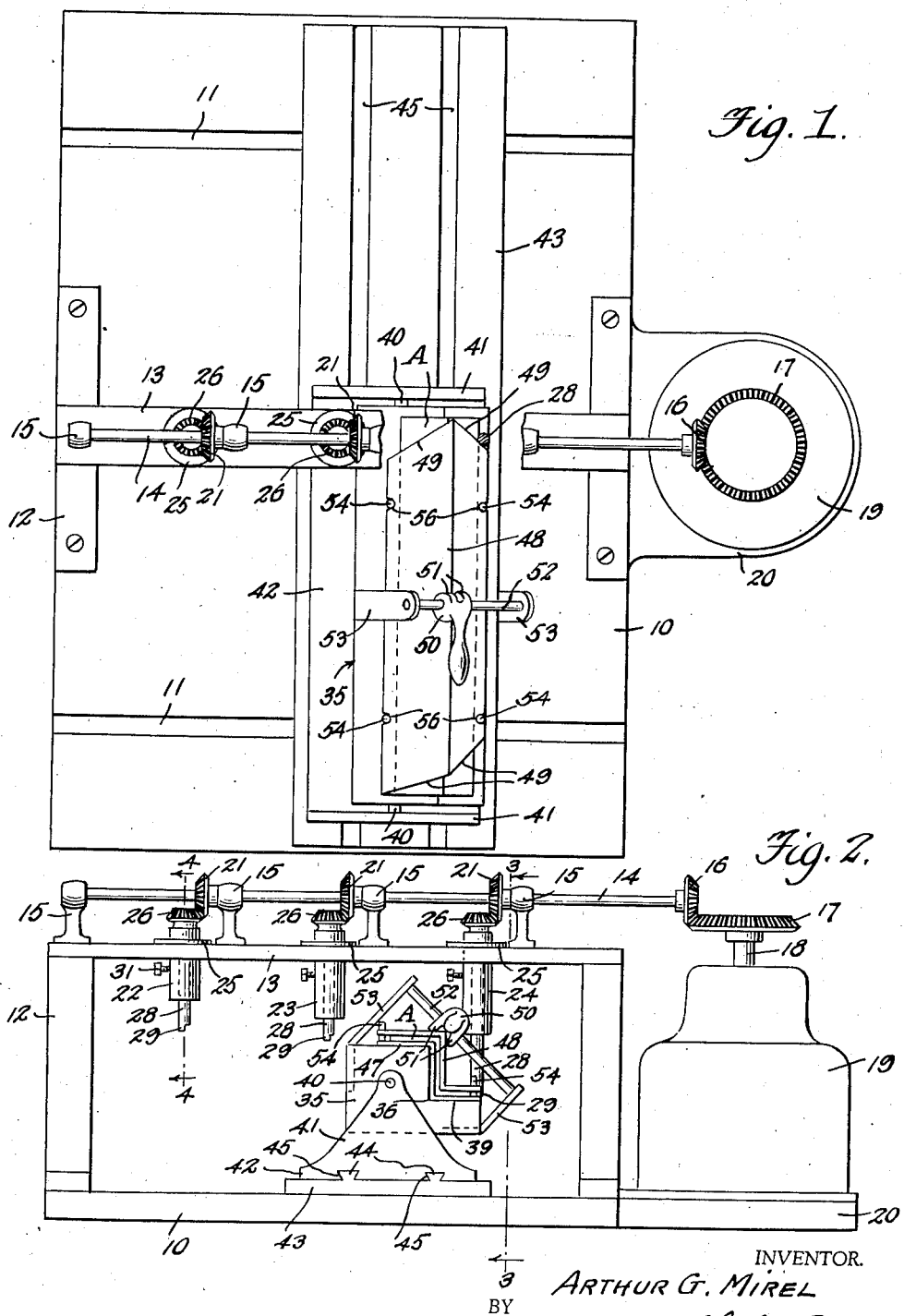

2,351,776

UNITED STATES PATENT OFFICE 2,351,776

DUPLICATE CUTTING MACHINE

Arthur G. Mirel, New York, N. Y.

Application September 27, 1941, Serial No. 412,657

4 Claims. (Cl. 90—13)

This invention is for a machine for facilitating and expediting the making of duplicate cuts in structural members and while not necessarily restricted thereto, the same is primarily designed for duplicating various angular cuts at the ends of the metallic stringers or struts which are employed in air craft construction.

At the present time, the wings, fuselage and other parts of air craft are internally reenforced with numerous stringers, struts or other equivalent structural members which are usually of angular, channeled or Z-shaped cross sectional configuration, the opposite ends of the webs and flanges of which are provided with various angular cuts so as to interfit with the covering plates or other structural parts. Heretofore these cuts have been made by individual shearing of the stringer ends or by other similar operations which invariably distort the members and require finishing processes thereby adding greatly to the time and expense involved.

It is, therefore, the principal object of the present invention to provide a machine in which templets are utilized in conjunction with the members to be cut and with a work support mounted for universal movement in a horizontal plane to present the members and templets to the action of a rapidly rotating cutter to thereby insure uniformity of the corresponding cuts to be made on each duplicate member.

As a further feature the invention comprehends a holder for the work and templet which may be readily adjusted so as to present to the rotating cutter any desired portion of the various webs and flanges of the members to be cut.

With the above enumerated and other objects in view, the invention is set forth in greater detail in the following specification and illustrated in the accompanying drawings in which:

Fig. 1 is a plan view of one embodiment of the machine with parts broken away and shown in section and illustrating a structure member and a templet in associated relation with the work holder.

Fig. 2 is an end view thereof.

Fig. 3 is a longitudinal sectional view taken approximately on the line 3—3 of Fig. 2.

Fig. 4 is an enlarged detail sectional view taken approximately on the line 4—4 of Fig. 2.

Fig. 5 is a fragmentary perspective view of a cutter element illustrating a modified form of the invention.

Fig. 6 is a similar view with the anti-friction ring removed.

Fig. 7 is a vertical sectional view taken approximately on the line 7—7 of Fig. 5.

Fig. 8 is a transverse sectional view taken on the line 8—8 of Fig. 5.

Fig. 9 is an end view of a modified form of the cutter element.

Fig. 10 is an enlarged fragmentary perspective view of one end of the work holder with the work and templet applied and illustrating the cutter element in juxtaposition thereto.

Referring to the drawings by characters of reference, 10 designates the base of the machine which is preferably disposed horizontally to provide an upper flat horizontal supporting surface and which in the present instance is provided with parallel laterally extending longitudinally spaced guide grooves 11 which, as shown, are of dovetail cross sectional configuration.

The base 10 is provided adjacent the opposite longitudinal side edges thereof with uprights 12 upon which are supported a cross bar 13. A drive shaft 14 extends longitudinally of the cross bar 13 and is supported thereabove by a series of bearing brackets 15 with a bevel pinion 16 secured to one end thereof. The bevel pinion meshes with a bevel gear 17 secured to the shaft 18 of a motor 19 which is supported upon a boss 20 projecting laterally from the base 10 whereby the drive shaft 14 is driven from the motor. The drive shaft is provided at longitudinally spaced intervals with miter gears 21 which are distributed transversely of the machine.

A plurality of cutter chucks 22, 23 and 24, corresponding in number to the number of miter gears 21 are journaled for rotation on vertical axes in bearing members 25 in the cross bar 13 and said chucks protrude upwardly from the cross bar and have secured to the upper ends thereof miter pinions 26 which mesh with the miter gears 21 to transmit motion from the drive shaft to the cutter chucks. The cutter chucks 22, 23 and 24 are of relatively different lengths and extend downwardly at relatively different distances below the cross bar 13. Each chuck is provided with a concentric bore 27 for receiving the cylindrical shank 28 of a cutter element, the lower end of which is fashioned to provide a cutter head 29 having a flat lower face 30. A set screw 31 extends through the portion of each chuck which protrudes below the cross bar 13 and is adapted to be brought into binding engagement with the shank 28 of the cutter element to removably secure the same in place and to permit of vertical adjustment of the cutter element with reference to the chuck. Under this construction and arrangement it is apparent that the cutter elements are simultaneously rotated on a vertical axis over and in fixed relation to the base 10 of the machine.

In order to support the work A which is herein illustrated as a stringer or strut of cross sectional Z-shape configuration, a work holder 35 is provided which is in the form of a block having a longitudinally rabbeted portion 36 at one corner thereof so as to provide angularly related faces 37, 38 and 39 with reference to which the angulated portions of the structural member are adapted to be disposed in superposed relation. The work holder 35 is supported for universal movement in a horizontal plane over the base 10 in any desired manner, and is also adapted for bodily turning movement to dispose anyone of its various angularly related faces uppermost so as to selectively present to the variously elevated heads of the cutter elements the webs and flanges of the members to be cut.

As illustrated in the embodiment disclosed, the work holder is mounted for bodily turning movement on aligned horizontal trunnions 40 projecting from the opposite ends thereof longitudinally of the machine and which trunnions are journaled in upstanding brackets 41 at the opposite ends of a slide member 42 which has guided longitudinal sliding connection with a bed 43 extending longitudinally of the base 10 of the machine and which bed is in turn connected with the base for guided lateral sliding movement thereover.

As illustrated, the guided sliding connection between the slide member 42 and the bed 43 consists of upstanding parallel longitudinally extending ribs 44 on the bed 43 which are of cross sectionally dovetail shape and correspondingly cross sectional dovetail shaped grooves 45 on the underside of the slide member 42. The bed 43 is provided with transverse longitudinally spaced parallel ribs 46 on the underside thereof which engage in the guide grooves 11 in the upper surface of the base 10 to establish connection therebetween for guided lateral sliding movement of the bed on the base.

In practice, the structural members A to be cut are positioned on the work holder 35 over a shim 47 which is of lesser length than the work holder and of a cross sectional shape to nest with the faces 37, 38 and 39 of the work holder. A templet 48 of corresponding cross sectional configuration having a similar web and flanges so as to nest with the structural member is arranged thereover. The templet 48 is cut to provide guide edges 49, the same being shown at the opposite ends thereof in the instant embodiment and the shim 47, the templet 48 and structural member A are secured in juxtaposition on the work holder 35 in any suitable manner to retain the same against relative movement with reference to each other and the work holder.

The retaining means includes an eccentric clamp 50 having a bifurcated terminal, the furcations 51 of which are adapted to straddle the corner of the templet. The clamp 50 is pivoted on a pivot pin 52 which is supported by brackets 53 carried by the work holder 35. The retaining means also include upstanding pins 54 on the faces 37 and 39 of the work holder which pins are engaged by the notches 55 and 56 at the opposite edges of the shim 47 and the templet 48. The pins 54 are of sufficient length to permit of the raising of the templet when positioning the work on the work holder and removing the same therefrom without the necessity of disengaging the templet from the pins.

After the work and templet are clamped in place on the work holder 35, the motor is started to actuate the drive shaft 14 and thereby transmit turning motion to the cutter elements which are driven at a high rate of speed, approximately seventeen thousand R. P. M. The operator then moves the work holder to advance the protruding end portions of the structural member A into engagement with one of the rapidly revolving cutter heads 29 so as to cut away the portion of the flange or web to coincide with the guide edges 49 of the templet. The cylindrical shank 28 immediately above the cutter head 29 serves to gage the cut to coincide exactly with the guide edges 49.

As illustrated, the initial cut is effected on the lowermost flange of the member A overlying the face 39 of the work holder 35, after which the work holder 35 is swung on the supporting trunnions 40 a 90° turn to dispose the intermediate lead or web of the member A overlying the face 38 in a horizontal plane to coincide with the cutter head 29 of the cutter element in the chuck 23 and the protruding portion of the member is cut away to coincide with the guide edge of the templet for the web of the work. The work holder is then retracted and turned 90° to the right to dispose the remaining flange of the member A overlying the face 37 of the work holder in a horizontal plane corresponding with the cutter head 29 of the cutter element in the chuck 22 and the work holder is manipulated to present the protruding portion of said flange of the member against the cutter head to cut away the material to coincide with the guide edge 49 of the templet. The work holder and work may then be shifted to the opposite side of the cross bar 13 to cut the opposite ends of the web and flanges to coincide with the guide edges 49 at the opposite end of the templet and the finished structural member A with the angulated cuts coinciding with the templet is then removed and a new piece of work positioned on the work holder between the shim 47 and templet 48 for repeating the cutting operations.

As illustrated in Figs. 5 to 8 inclusive, the shank 28 of the cutter element may be provided with an anti-friction ring 28a located immediately above the cutter head 29 so as to reduce friction at the point of engagement of the shank with the guide edges 49 of the templet when gaging the pattern of the cut. As illustrated, the anti-friction ring 28a is in the form of a split annular resilient contractile member which is rotatably supported on the cutter shank 28 within the annular groove 28b and the outer periphery of which ring is flush with the outer periphery of the cutter head 29 and the outer periphery of the shank 28.

It has been found in practice that the removal of the work or element A after being cut and the emplacement of a new piece of work for cutting may be expeditiously accomplished without the necessity of removing the shim 47 or the templet 48 by first releasing the eccentric clamp 50, engaging the end of the new piece of work with the previously cut piece and effecting the endwise sliding of the cut piece from between the shim and templet as the new piece is inserted in place therebetween. The eccentric clamp 50 is then turned to clamp the new piece of work in place.

What is claimed is:

1. A duplicating cutting machine for cross sectionally angulated structural members including a horizontally disposed base, a plurality of cutter elements mounted for rotation on vertical axes at different elevations over and in fixed relation to the base, said cutter elements each having a cylindrical shank with a cutter head at the lower terminal having a flattened lower end, a work support having angularly related faces corresponding with the angulated portions of the structural members and adapted to support a structural member in superposed relation therewith, said work support being mounted for universal movement in a horizontal plane over said base and adapted to be turned with reference to the base to selectively dispose the angularly related faces parallel with said base for presenting to the variously elevated cutter elements portions of the webs and flanges of the members to be cut, and a templet secured upon the work support in juxtaposition to the structural member thereon, said templet having one or more guide edges adapted to engage the shanks of the cutter elements for gaging the cutting of the members by the cutter elements to conform with the guide edges of the templet.

2. In a duplicating machine for cutting cross sectionally angulated members, a horizontally disposed base, a driven cutter element mounted for rotation on a vertical axis disposed in fixed relation to and over the base, and having a cylindrical shank and a cutter head at the lower terminal thereof, a work support having angularly related faces and mounted for universal movement in a horizontal plane over the base and adapted to be turned with reference to the base to selectively dispose the angularly related faces thereof in a plane parallel with the base, a templet having angularly related faces corresponding to the angulated portions of the members to be cut, said templet being disposed with the angular portions thereof in superposed relation with the angulated portions of the member to be cut and in superposed relation with the angulated faces of the work support, and means carried by said work support for securing the templet and a member to be cut upon the work support, the templet having guide edges adapted to respectively engage the shank of the cutter element when the faces of said templet are respectively disposed in a plane parallel to the base for gaging the cutting of the member by said cutting element so as to conform with the guide edges of the templet.

3. In a duplicating machine for cutting cross sectionally angulated structural members, a horizontally disposed base, a plurality of driven cutter elements mounted for rotation on vertical axes disposed in fixed relation to the base and each having a cylindrical shank and a cutter head at the lower terminal thereof, a work support having angularly related faces and mounted for universal movement in a horizontal plane over said base and adapted to be turned with reference to the base to selectively dispose the angularly related faces in a plane parallel with the base, a templet having angularly related faces corresponding to the angulated portions of the structural members to be cut and having recessed opposite edge portions, said templet being adapted to be disposed with the angulated portions thereof in superposed relation with the angulated portions of the structural member to be cut and in superposed relation with the angulated faces of the work support and with the recessed edge portions of the templet projecting beyond the opposite edges of the structural member, means disposed between the work support and the structural member providing a clearance space between the edges of the structural member to be cut and the work support, means carried by the work support adapted to engage with the recessed edges of the templet for securing the same against lateral movement, and means carried by said work support for clamping the templet and the structural member upon the work support, the angulated faces of said templet having guide edges adapted to engage the shanks of the cutter elements respectively when the faces of said templet are respectively disposed in a plane parallel with the base for gaging the cutting of the structural member by said cutting elements to conform with the guide edges of the templet.

4. In a duplicating machine for cutting cross sectionally angulated structural members, a horizontally disposed base, a plurality of driven cutter elements mounted for rotation on vertical axes disposed in fixed relation to the base and each having a cutter head at the lower terminal and a sleeve rotatably mounted on the shank thereof, a work support having angularly related faces and mounted for universal movement in a horizontal plane over said base and adapted to be turned with reference to the base to selectively dispose the angularly related faces in a plane parallel with the base, a templet having angularly related faces corresponding to the angulated portions of the structural members to be cut and having recessed opposite edge portions, said templet being adapted to be disposed with the angulated portions thereof in superposed relation with the angulated portions of the structural member to be cut and in superposed relation with the angulated faces of the work support and with the recessed edge portions of the templet projecting beyond the opposite edges of the structural member, means disposed between the work support and the structural member providing a clearance space between the edges of the structural member to be cut and the work support, means carried by the work support adapted to engage with the recessed edges of the templet for securing the same against lateral movement, and means carried by said work support for clamping the templet and the structural member upon the work support, the angulated faces of said templet having guide edges adapted to engage the sleeves of the cutter elements respectively when the faces of said templet are respectively disposed in a plane parallel with the base for gaging the cutting of the structural member by said cutting elements to conform with the guide edges of the templet.

ARTHUR G. MIREL.